United States Patent [19]

Kim

[11] Patent Number: 4,620,942

[45] Date of Patent: Nov. 4, 1986

[54] ELECTRICALLY CONDUCTIVE LADDER POLYMERS

[75] Inventor: Oh-Kil Kim, Burke, Va.

[73] Assignee: The United States of America as represented by the Secretary of the Navy, Washington, D.C.

[21] Appl. No.: 499,710

[22] Filed: May 31, 1983

[51] Int. Cl.[4] .................. C08G 73/00; C08G 73/10
[52] U.S. Cl. .................... 252/500; 252/510; 252/518
[58] Field of Search .................. 252/500, 510, 518

[56] References Cited

U.S. PATENT DOCUMENTS

| | | | |
|---|---|---|---|
| 3,966,987 | 6/1976 | Suzuki et al. | 252/500 |
| 4,344,869 | 8/1982 | Blinne et al. | 252/500 |
| 4,344,870 | 8/1982 | Blinne et al. | 252/500 |
| 4,360,644 | 11/1982 | Naarman et al. | 252/500 |
| 4,375,427 | 3/1983 | Miller et al. | 252/500 |

OTHER PUBLICATIONS

Aronson et al., "Thermodynamic Properties of the Graphite-Bisulfate Lamellar Compounds", Carbon 9, 715 (1971).
Ga, S. et al., "Organic Metals, " New Classes of p-type Dopants for Converting Polyacetylene $(CH)_x$ into the Metallic State' Chem. Comm., 662 (1979).

Primary Examiner—Lester L. Lee
Attorney, Agent, or Firm—Robert F. Beers; Sol Sheinbein; Barry A. Edelberg

[57] ABSTRACT

Benzimidazobenzophenanthroline type ladder polymers are doped with Lewis acids, protonic acids, potassium, or an alkali napthalide. The resulting doped polymers are useful semiconductors.

20 Claims, 1 Drawing Figure

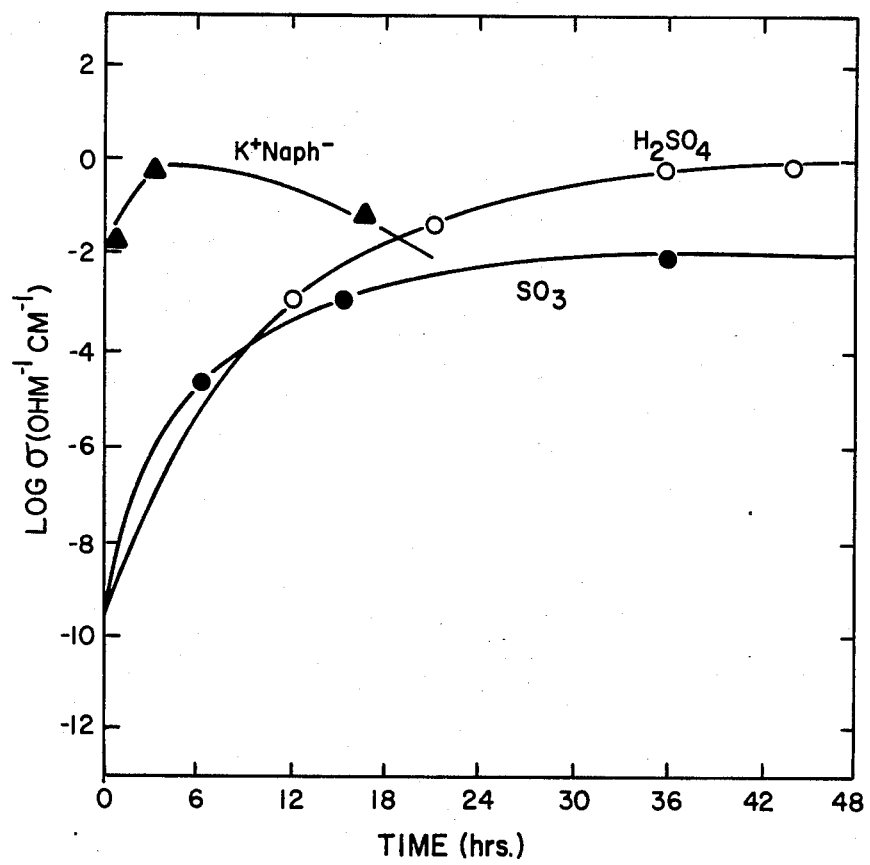

ELECTRICALLY CONDUCTIVE LADDER POLYMERS

FIELD OF THE INVENTION

This invention relates generally to conductive polymers and more specifically to conductive fiber- or film-forming polymers.

BACKGROUND OF THE INVENTION

In recent years, it has been reported that certain linear conjugated organic polymers such as poly (acetylene), poly(p-phenylene) and poly (p-phenylene sulfide), become highly conductive when properly doped. With the exception of poly(acetylene), they are crystalline but intrinsically insulating when undoped.

There have been many polymers known to be semiconductive when complexed with a relevant dopant. However, only scores of polymers are true semiconductors ($\sigma = 10^{-3} - 1$ ohm$^{-1}$cm$^{-1}$). Among these conductive polymers, only a handful are film- or fiber-forming semiconductors. The others are insoluble or infusible conductive solids, greatly limiting their practical potential as materials for fabricating pn junctions. Further, many polymer films, upon doping, lose their strength and flexibility.

Heteroaromatic ladder polymers of the bezimidazobenzophenanthroline type, e.g. poly[(7-oxo-7,10H-benz[de]imidazo[4',5':5,6]benzimidazo[2,1-a]isoquinoline-3,4:10,11-tetrayl)-10-carbonyl], referred to as "BBL", and poly(6,9-dihydro-6,9-1-dioxobisbenzimidazo [2,1-b:1',2'-j]-benzo[1 mn][3,8]phenanthroline-3,12-diyl) referred to as "BBB", have unique structures in the solid state. This type polymer has essentially two-dimensional, oriented, fully conjugated, and layered structures. Nevertheless, because a somewhat high ionization potential is expected from the amide groups in the polymer, it was hitherto not expected that this type of polymer would exhibit a high doped conductivity.

OBJECTS OF THE INVENTION

An object of this invention is to provide a highly conductive polymer.

Another object of this invention is to provide a highly conductive polymer which is film or fiber forming.

A further object of this invention is to provide a polymeric substance capable of being utilized as a pn junction.

Yet another object of this invention is to provide a doped polymer having good strength and flexibility.

SUMMARY OF THE INVENTION

These and other objects are achieved by doping a ladder polymer of the benzimidazobenzophenathroline type with a Lewis acid, a protonic acid, potassium metal or potassium napthalide.

BRIEF DESCRIPTION OF THE DRAWING

The exact nature of this invention as well as other objects and advantages will be readily apparent from consideration of the following specification and drawing which shows, in graphic form, the dependance of film conductivity upon treatment time for several dopants.

DESCRIPTION OF THE PREFERRED EMBODIMENTS

To make the composition of this, invention, a benzimidazobenzophenanthroline ladder polymer is doped with a Lewis acid, a protonic acid, potassium or an alkali napthalide. Polymers such as BBL and BBB may be prepared as described in R. L. Van Deusen, J. Polym. Sci. B4, 211 (1966), incorporated herein by reference.

The polymers may be doped by any known technique. The dopant may include a substance such as $BF_3$, $AsF_5$, $SO_3$, and $H_2SO_4$, which yields a p-type doped polymer, and a substance such as potassium metal or an alkali napthalide, which yields an n-type doped polymer. Preferably, the dopant is $BF_3$, $AsF_5$, $SO_3$, $H_2SO_4$, potassium, or potassium napthalide. Most preferably the dopant is $SO_3$, $H_2SO_4$, or potassium napthalide.

Although the polymers herein were doped primarily in the film form, using gaseous dopants, the polymers may be doped in any reasonable manner. For example, the polymer may be doped while in a solution containing the appropriate dopant.

The dopant levels employed may be varied widely depending upon the intended end use and the conductivity desired. The appropriate doping levels may be simply found by routine experimentation involving no inventive skill. In this description and the claims that follow, the term "effective amount" refers to the amount of dopant required to yield the appropriate doping level. Typically, the appropriate doping level is at least that level of doping which yields a polymer having a conductivity of $10^{-7}$ ohm$^{-1}$cm$^{-1}$.

EXAMPLES

Having described the invention in general, the following examples are being given to illustrate the principles of the invention and are not intended to limit the scope of the invention in any manner.

EXAMPLE 1

(Halogen Doping)

BBL and BBB polymer films (20-60 microns thick) were doped with iodine vapors. The films turned color briefly from their original golden color to a greenish color. After a short time the greenish color faded. The doping had a negligible effect on conductivity.

EXAMPLE 2

($BF_3$ Doping)

Undoped BBL and BBB polymers as described in Example 1 were exposed to $BF_3$ vapors for 2 days at room temperature. The doped polymers were found to have an enhanced conductivity ($\sigma = 10^{-7}$ ohm$^{-1}$cm$^{-1}$).

EXAMPLE 3

($AsF_5$ Doping)

The procedures described in Example 2 were carried out, substituting $AsF_5$ for $BF_3$. The doped films showed a significantly enhanced conductivity ($\sigma = 10^{-3}$ ohm$^{-1}$cm$^{-1}$).

EXAMPLE 4

($H_2SO_4$ Doping)

$H_2SO_4$ (98%) was vacuum pumped over undoped BBL and BBB polymer films (20–60 microns thick) at approximately 35° C. for 2 days. The films showed a markedly enhanced conductivity ($\sigma=2$ and 1 ohm$^{-1}$cm$^{-1}$ for BBL and BBB, respectively).

EXAMPLE 5

($SO_3$ Doping)

Fuming sulfuric acid (30% $SO_3$) was warmed to 35° C. to feed dry $SO_3$ into a sample tube kept in vacuum, then allowed to react with the film in the tube (BBB or BBL) for two days at room temperature. The films showed a markedly enhanced conductivity ($\sigma=1\times10^{-2}$ and $1\times10^{-3}$ ohm$^{-1}$cm$^{-1}$ for BBL and BBB respectively).

After treatment in accordance with Example 4 or 5, the doped films remained flexible but an enormous dimension change in thickness and a concomitant weight change accompanied the acid doping, particularly with sulfuric acid. The film thickness increased 20–25% and the weight increase was nearly 200%, corresponding to the molar ratio of the $H_2SO_4$ or $SO_3$ dopant with respect to the repeating unit in the polymer ranging from 6:1 to 8:1. Such an unusually high doping ratio is suspected to result from the layered structure of the polymer and/or the polar groups in polymer.

EXAMPLE 6

(Potassium Doping)

A polymer film sample (BBL) (20–60 microns thick) was mounted in one end of a vacuum sealed reaction vessel. Potassium metal was placed at the other end. The reaction vessel was placed in a double furnace in which temperature differences could be maintained between the potassium and the sample. The sample temperature ($t_2$) was kept about 70° C. higher than the potassium temperature ($t_1$) to maximize the doping effect. Doping was carried out at 300°–500° C. After doping, the reaction vessel was removed from the furnace and allowed to cool at room temperature. The conductivity of the doped film was found to increase with the treatment time and temperature. The room temperature conductivity of the doped BBL polymer was $2\times10^{-1}$ ohm$^{-1}$cm$^{-1}$ when the sample was treated at $t_2=470°$ C. and $t_1=400°$ C. for 24 hours.

EXAMPLE 7

(Potassium Napthalide)

A 10% potassium napthalide solution is prepared by dissolving 5 g of pure napthaline in 50 ml of freshly distilled THF and adding 2 g potassium metal to the solution piece by piece in a glove box. The doping solution thus made was kept in a reservoir connected to a reaction tube into which a polymer film sample (BBL) (20–60 microns thick) was mounted on a 4 probe wire. The doping solution was then transfered into the reaction tube. After 90 min. passed, the doping solution was transfered back into the reservoir, and the sample washed and dried. The conductivity of the sample was found to be 1 ohm$^{-1}$cm$^{-1}$.

Table 1 summarizes the results of Examples 1–7. Table 2 summarizes in greater detail, the results obtained in Examples 4 and 5. The drawing illustrates the effect of treatment time on BBL polymer conductivity when the film is doped in accordance with Examples 4, 5 or 7.

TABLE 1

| DOPANT | CONDUCTIVITY (ohm$^{-1}$cm$^{-1}$) | APPEARANCE | [DOPANT]/[BBL] Unit |
|---|---|---|---|
| None | $10^{-12}(10^{-14})$* | Gold | |
| I | $10^{-10}$ | Brown | |
| $BF_3$ | $10^{-7}$ | Blue-Green | |
| $AsF_5$ | about $10^{-3}$ | Dark Green | |
| $SO_3$ | $1\times10^{-2}(10^{-3})$* | Dark Green | 6 |
| $H_2SO_4$ | 2.1 (1)* | Green-Black | 8 |
| K (Metal) | $2\times10^{-1}$ | Brown-Black | |
| $K^+$ Naph$^+$ | 1.1 | Green-Black | |

*Values for BBB Polymer (all others are for BBL)

TABLE 2

| Time (h) | Dopant | Weight Increase (%) | Conductivity (ohm$^{-1}$cm$^{-1}$) |
|---|---|---|---|
| 6 | $SO_3$ | 40 | $3\times10^{-5}$ |
| 12 | $H_2SO_4$ | 60 | $2\times10^{-3}$ |
| 16 | $SO_3$ | 120 | $1\times10^{-3}$ |
| 20 | $H_2SO_4$ | 140 | $6\times10^{-2}$ |
| 36 | $SO_3$ | 200 | $1\times10^{-2}$ |
| 36 | $H_2SO_4$ | 200 | 2 |

Upon doping the films became increasingly opaque in the infrared (IR). With films lightly doped with $H_2SO_4$, it was observed that the bands at 1690 cm$^{-1}$ (C=O stretching) and 1560 cm$^{-1}$ (C=C vibrations) shifted to a higher frequency by about 30 cm$^{-1}$ compared with undoped samples. However, a similar shift in the same region was also observed with films doped with $SO_3$, $AsF_5$, and $BF_3$, and with perchloric acid and other acids. Therefore, it is difficult to determine from the IR whether the mode of complexation by $H_2SO_4$ involves protonation or oxidation, but it is likely that the primary sites of complexations are the same regardless of the doping species, e.g., on the imino-nitrogens where the complexations can be more facilitated by the $\pi$-polarization effect.

The conductivity of acid-doped films deteriorated in the air somewhat rapidly in the early stage down to about $10^{-3}$ ohm$^{-1}$cm$^1$, but very slowly thereafter. The donor-doped films were rather sensitive to air exposure compared with the acid-doped one but the deterioration rate was much slower than expected, retaining the initial appearance of the doped film. Significantly, neither the strength nor the flexibility of the films decreased noticably after doping.

Further details and discussion concerning this invention may be found in Kim, Oh-Kil, "Electrical Conductivity of Heteroaromatic Ladder Polymers, *J. of Polymer Sci.: Polymer Letters Edition*, Vol. 20, 663–66 (1982), incorporated herein by reference.

A Lewis acid, a protonic acid, potassium metal or an alkali napthalide may also be employed in combination with any other dopant of the same p- or n-type to enhance the conductivity of a benzimidazobenzophenathroline-type polymer. In this context, the term "effective amount" implies the amount of any single Lewis acid, protonic acid, potassium metal or alkali napthalide dopant required to yield an appropriate doping level when employed in conjunction with the other dopant agent or agents.

Obviously, many modifications and variations are possible in the light of the above teachings. It is therefore to be understood that, within the scope of the appended claims, the invention may be practiced otherwise than as specifically described.

What is claimed and desired to be secured by Letters Patent of the United States is:

1. A benzimidazobenzophenanthroline ladder polymer, said polymer having been doped with at least an effective amount of a dopant chosen from the group consisting of Lewis acids, protonic acids, potassium metal, and an alkali napthalide while said polymer was in film or fiber form, said effective amount of dopant rendering said polymer electrically conductive.

2. The composition of claim 1 wherein said dopant is chosen from the group consisting of $BF_3$, $AsF_5$, $SO_3$, $H_2SO_4$, potassium metal and an alkali napthalide.

3. The composition of claim 2 wherein said dopant is chosen from the group consisting of $SO_3$, $H_2SO_4$, potassium metal and potassium napthalide.

4. The composition of claim 1 wherein said polymer is doped with at least two dopants, at least one of which is chosen from the group consisting of Lewis acids, protonic acids, potassium metal, and an alkali napthalide to yield a polymer having an appropriate doping level.

5. A benzomazobenzophenanthroline ladder polymer, said polymer having been doped with an effective amount of a dopant selected from the group consisting of $H_2SO_4$ and $SO_3$ while said polymer was in the solid state.

6. The composition of claim 5 wherein the molar ratio of said dopant with respect to the repeating unit in said polymer is from about 6:1 to 8:1.

7. A method of making a conductive polymer comprising the step of doping a benzimidazobenzophenanthroline ladder polymer with at least an effective amount of a dopant chosen from the group consisting of Lewis acids, protonic acids, potassium metal and an alkali napthalide while said polymer is in film or fiber form, said effective amount of dopant rendering said polymer electrically conductive.

8. The method of claim 7 wherein said doping step comprises selecting a dopant from the group consisting of $BF_3$, $AsF_5$, $SO_3$, $H_2SO_4$, potassium metal and an alkali napthalide.

9. The method of claim 8 wherein said doping step comprises selecting a dopant from the group consisting of $SO_3$, $H_2SO_4$, potassium metal and potassium napthalide.

10. The method of claim 9 wherein said doping step comprises selecting a dopant from the group consisting of $H_2SO_4$ and $SO_3$.

11. The method of claim 10 wherein said doping step comprises doping said polymer until the molar ratio of said dopant to said polymer is from about 6:1 to 8:1.

12. The composition of claim 6 wherein said polymer is selected from the group consisting of poly[(7-oxo-7,10H-benz[de]imidazo[4′,5′:5,6]benzimidazo[2,1-a]isoquinoline-3,4:10,11-tetrayl)-10-carbonyl], and poly(6,9-dihydro-6,9-dioxobisbenzimidazo[2,1-b:1′,2′-j]-benzo[1 mn][3,8]phenanthroline-3,12-diyl).

13. The method of claim 11 further comprising the step of selecting said polymer from the group consisting of poly[(7-oxo-7,10H-benz[de]imidazo[4′,5′:5,6]benzimidazo[2,1-a]isoquinoline-3,4:10,11-tetrayl)-10-carbonyl], and poly(6,9-dihydro-6,9-dioxobisbenzimidazo[2,1-b:1′,2′-j]-benzo[1 mn][3,8]phenanthroline-3,12-diyl).

14. A benzimidazobenzophenanthroline ladder polymer, said polymer having been doped with at least an effective amount of a dopant chosen from the group consisting of Lewis acids, protonic acids, potassium metal, and an alkali napthalide while said polymer was in film form, said effective amount of dopant rendering said polymer electrically conductive.

15. The composition of claim 14 wherein said dopant is chosen from the group consisting of $BF_3$, $AsF_5$, $SO_3$, $H_2SO_4$, potassium metal and an alkali napthalide.

16. The composition of claim 15 wherein said dopant is chosen from the group consisting of $SO_3$, $H_2SO_4$, potassium metal and potassium napthalide.

17. The composition of claim 16 wherein said polymer is doped with at least two dopants, at least one of which is chosen from the group consisting of Lewis acids, protonic acids, potassium metal, and an alkali napthalide to yield a polymer having an appropriate doping level.

18. A benzimazobenzophenanthroline ladder polymer, said polymer having been doped with an effective amount of a dopant selected from the group consisting of $H_2SO_4$ and $SO_3$, while said polymer was in film form, said effective amount of dopant rendering said polymer electrically conductive.

19. The composition of claim 18 wherein the molar ratio of said dopant with respect to the repeating unit in said polymer is from about 6:1 to 8:1.

20. The composition of claim 19 wherein said polymer is chosen from the group consisting of poly[(7-oxo-7,10H benz[de]imidazo[4′,5′:5,6] benzimidazo[2,1-a]isoquinoline-3,4:10,11-tetrayl)-10-carbonyl] and poly(6,9-dihydro-6,9-dioxobisbenzimidazo[2,1-b:1′,2′-j]-benzo[1 mn][3,8]phenanthroline-3,12-diyl).

* * * * *